Figure 6:
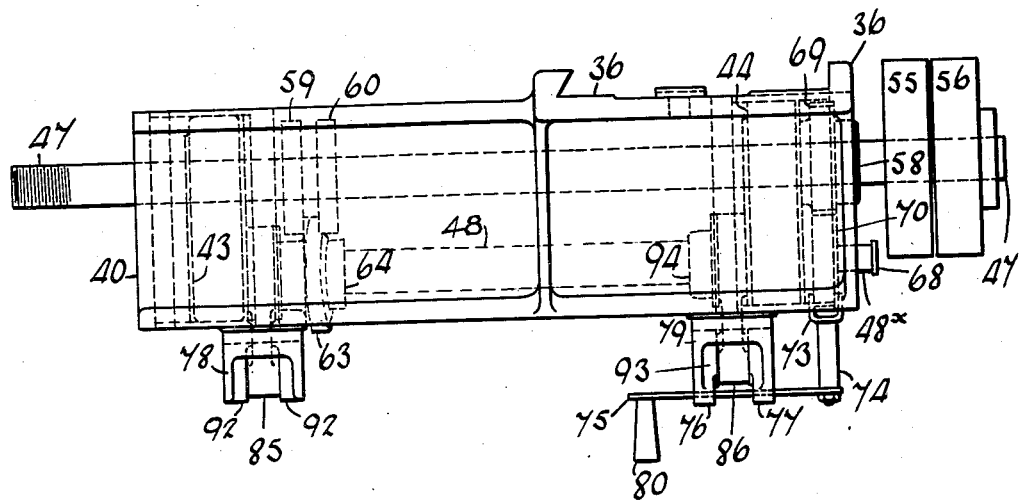

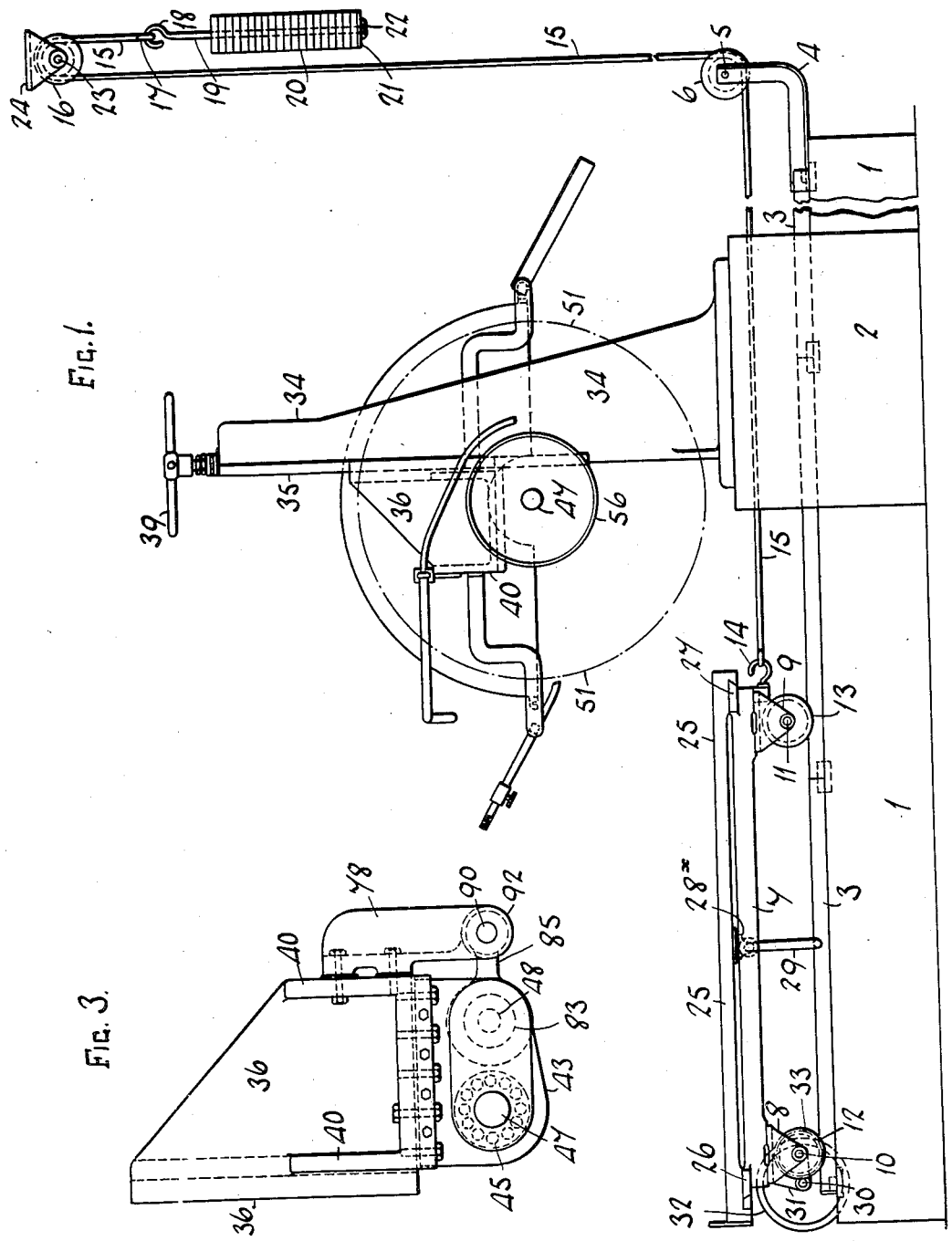

Oct. 9, 1934. W. H. FITTON ET AL 1,976,164
MACHINERY OR APPARATUS FOR CUTTING STONE, WOOD, METALS, AND OTHER MATERIALS
Filed Jan. 15, 1931 4 Sheets-Sheet 2
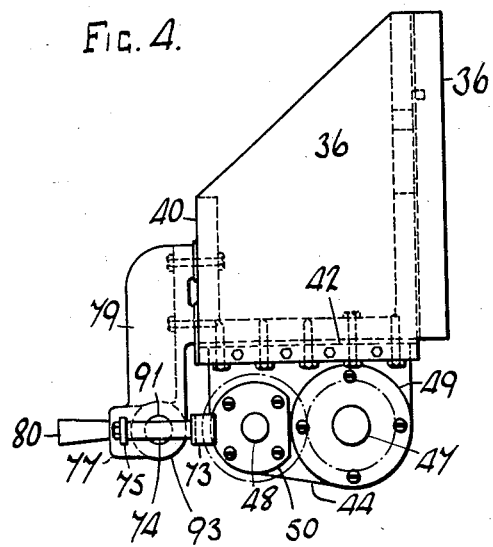
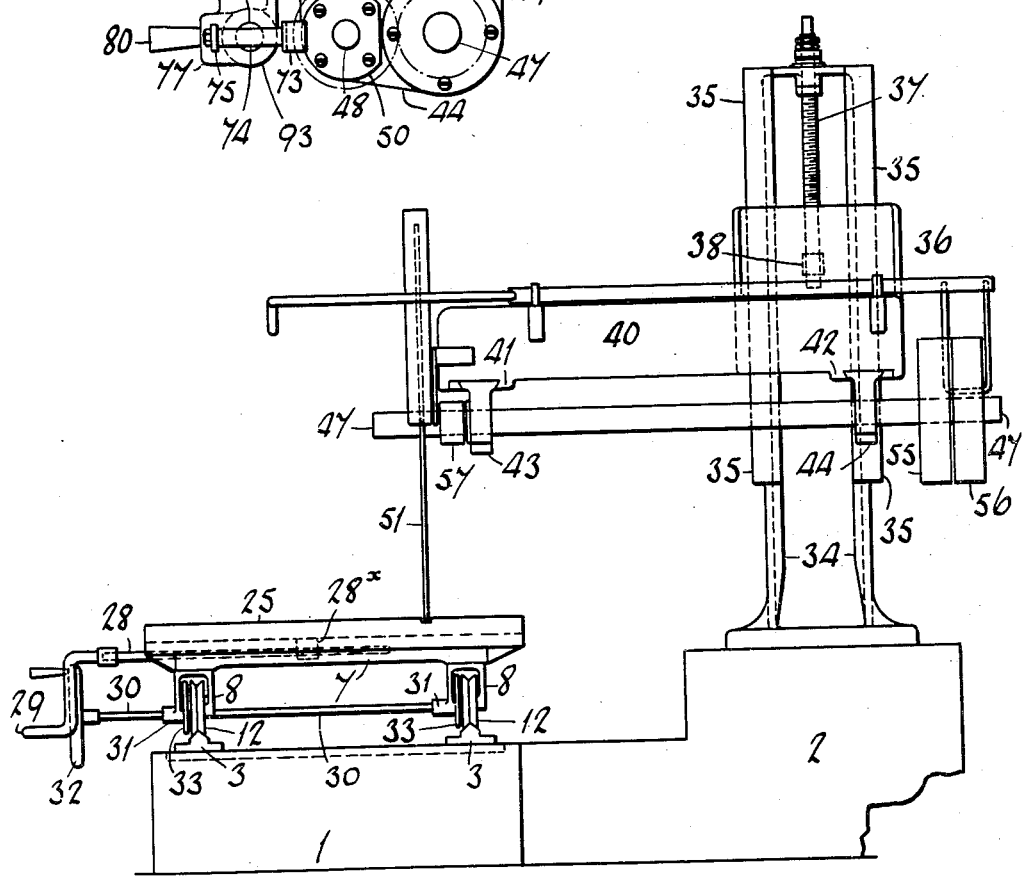
INVENTORS.
W. H. FITTON.
G. ELLIOTT.
By J. E. McFetherstonhaugh
ATTY.

INVENTORS.
W. H. FITTON.
G. ELLIOTT.
ATTY.

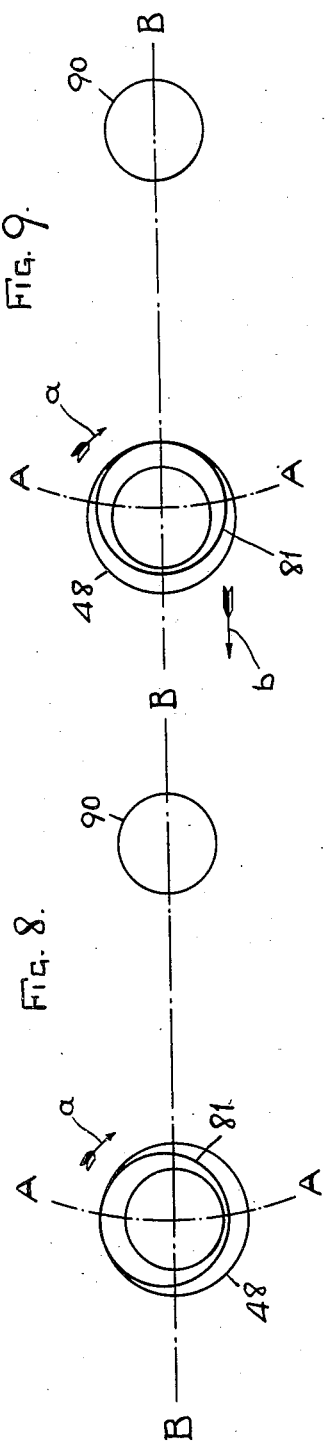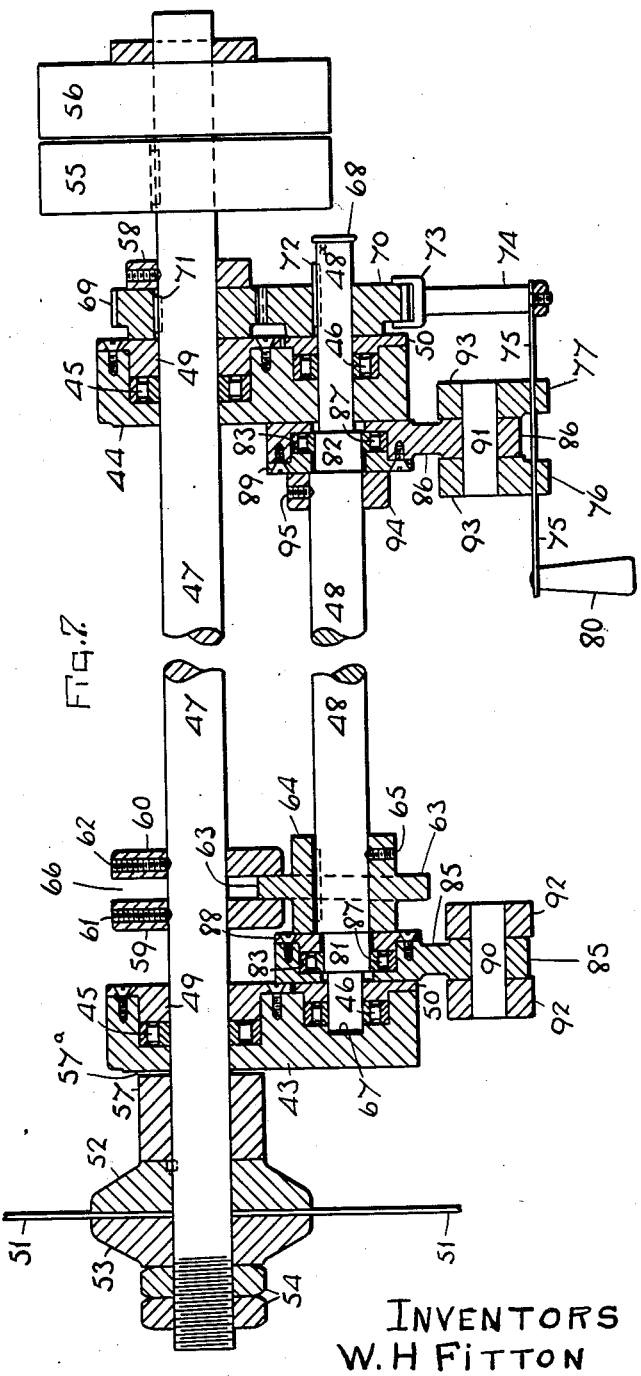

Patented Oct. 9, 1934

1,976,164

UNITED STATES PATENT OFFICE 1,976,164

MACHINERY OR APPARATUS FOR CUTTING STONE, WOOD, METALS, AND OTHER MATERIALS

William Henry Fitton, Bramley, Leeds, and Graham Elliott, Thorner, near Leeds, England, assignors of one-third to Bramley Engineering Co. Limited, Hunslet, Leeds, England, a company of Great Britain and Northern Ireland Application January 15, 1931, Serial No. 508,930
In Great Britain February 3, 1930

6 Claims. (Cl. 125—13)

This invention relates to machinery or apparatus for cutting stone, marble, slate, limestone, wood, metal, and other materials,—all of which are hereinafter termed and included in the term "the material",—of the type in which a circular saw, or metal disc with a peripheral cutting edge is fixed upon a shaft to which, in addition to a rotary motion, there is imparted another movement for causing the cutting edge of the saw or disc to operate with a percussive and abrasive action upon the material.

Hitherto the alternate approach and recession of the saw or disc relatively to the material to be cut has been effected by maintaining a fixed position for the shaft on which the saw or disc is mounted, and superimposing, on the steady advance of the material towards it, a small reciprocating motion. Or, a reciprocating motion has been imparted to the shaft by mounting it on pivoted arms to which an oscillating motion is imparted by eccentrics mounted on a separate shaft to which motion is imparted by pulleys and a belt from the saw or disc shaft for rotating the two shafts at the same or different speeds. Further, to obtain the percussive and abrasive action of the saw or disc and for bringing a fresh portion of the periphery of the latter at each successive cut, the shaft carrying the saw or disc has been mounted in one or more eccentric sleeves to which a rotary motion, at a different speed to that of the shaft, has been imparted. Also, machines for working stone have been provided with a number of rotatable discs on which have been mounted concentrically a number of cutting wheels for giving a succession of blows to the material operated upon.

In this invention in addition to making provision for the above named approach and recession of the saw or disc by means of a linear reciprocatory motion imparted to its shaft, a small sliding or longitudinal movement is imparted to the shaft or spindle upon which the saw or disc is mounted.

In the drawings hereunto annexed are shown means for carrying the invention into practice, in which—

Figure 5:
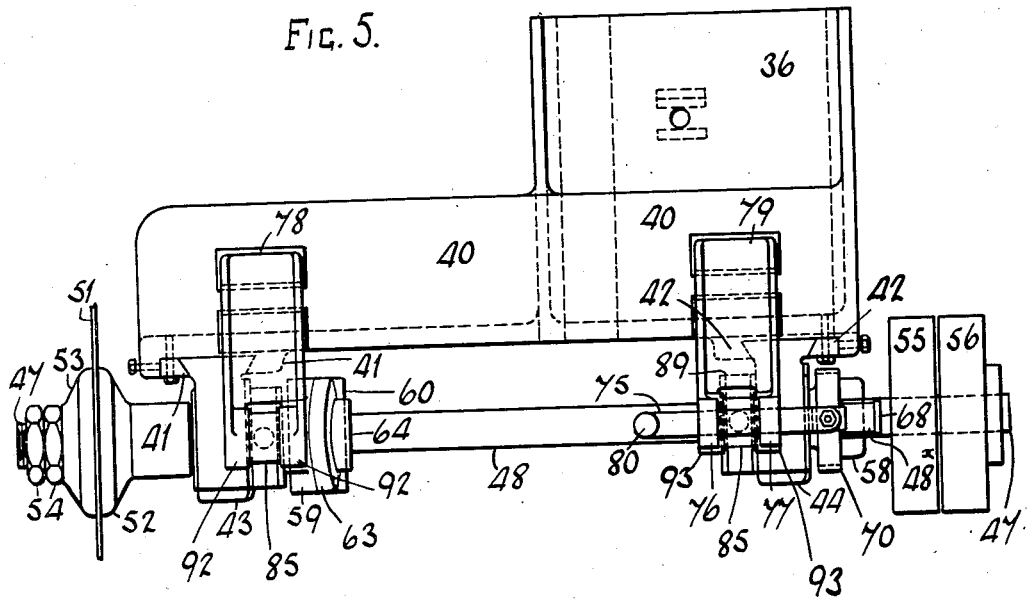

Fig. 1 is an elevation of a machine of ordinary construction such as is employed for cutting stone and the like material with this invention applied thereto;

Fig. 2 an end elevation of Fig. 1;

Fig. 3 a front elevation of the saddle portion and parts connected therewith;

Fig. 4 a rear elevation of Fig. 3;

Fig. 5 a side elevation of the saddle, shafts and parts mounted thereon shown at Fig. 3;

Fig. 6 a plan looking on the top of Fig. 5 with the saw or disc removed;

Fig. 7 an enlarged sectional plan showing the arrangement of shafts or spindles and parts connected therewith at the front and rear ends of the saddle;

Figs. 8 and 9 are diagrammatic illustrations of the mode of operation of the invention.

Like parts in all the views are marked with similar reference numerals.

1 and 2 are portions of the bed or framework of an ordinary stone cutting machine; the said portions being usually arranged at or about a right angle to each other. The upper surface of the portion 2 is on a higher level than that of the portion 1. The ends of the portion 1 extend beyond the sides of the portion 2, as shown at Fig. 1. To the upper surface of the portion 1 are fixed a pair of longitudinal rails 3, 3. To the end of each of the rails is fixed a bracket 4 turned in an upward direction to form a bearing for a horizontal shaft 5 on which is fixed a pulley 6 having a groove cut in its periphery. On the rails 3, 3, is mounted a carriage 7 provided with pendant bifurcated brackets 8, 8, 9, 9, in which are mounted the spindles 10, 10, 11, 11 having wheels 12, 12, 13, 13, respectively mounted thereon. Each of the said wheels has a V-shaped groove formed in its periphery to suit the contour of the rails 3, 3, upon which the wheels 12, 12, 13, 13, are arranged to run. To one of the ends of the carriage 7 is fixed a hook 14 to which is attached one end of a wire or other rope 15 which passes respectively under and partially around pulley 6 fixed on the shaft 5 and over pulley 16 for enabling its second end 17 to be attached to the hooked end 18 of the stem of rod 19 on which are arranged a number of adjusting weights 20. The rod 19 is provided with a plate 21 and nut 22 for retaining the weights in position. The pulley 16 is mounted upon a spindle 23 carried by a bifurcated bracket 24 which may be fixed to any suitable support or rafter not shown in the drawings. On the top of the carriage 7 is mounted a table 25,—which slides in guides 26, 27,—on which the stone or other article to be cut is placed. The stone,—not shown in the drawings,—is adjusted to the saw or cutting tool by the screw shaft 28, mounted in a suitable bearing and a nut $28^x$ fixed to the undersurface of the table 25. The screw shaft 28 is provided with a handle 29 for operative purposes. On a shaft 30, carried by extensions 31, 31, on the brackets 8, 8,—fixed to the undersurface of the carriage 7,—is fixed a hand wheel 32 for imparting a travelling motion to the carriage when required, the shaft 30 and the wheels 12, 12 being geared together by spur gearing 33.

All the above described parts are of the usual and ordinary construction for this class of machine.

On the portion 2 of the bed or framework is fixed a vertical standard 34 provided with the slides 35, 35, on which is mounted, so as to slide freely, a carrier, hereinafter termed "the saddle", Figs. 3 to 6. The vertical portion 36 of the saddle is arranged to be mounted on the slides 35, 35 so as to be raised and lowered to its working position by a pendant vertical screw shaft 37 working in a nut 38 fixed to the rear of the said portion of the saddle. The screw shaft is provided with the usual collars, and lock nuts for retaining it in its working position and with a hand wheel 39 for operative purposes. The saddle is also provided with a horizontal portion 40 to the lower surface of which are formed or fixed a pair of transverse slides 41, 42 arranged at a suitable distance from each of its ends. In each of the slides 41, 42 is mounted a pendant portion,—marked respectively 43, 44,— to which an intermittent horizontal reciprocating motion is imparted, as will be presently described. The pendant portions 43, 44 are each provided with a pair of roller or other bearings 45, 46 at a suitable distance from their lower ends for the reception of two shafts or spindles,— hereinafter respectively termed "the saw or disc spindle 47" and "the cam shaft 48".—which may be of different lengths and diameters. By mounting the saw spindle 47 and cam shaft 48,—as shown at Figures 3 and 4,—in the two pendant sliding blocks 43, 44, the said spindle and shaft are retained in parallel alignment and are capable of reciprocating together in a horizontal direction. Also, the mechanism for causing the approach and recession of the saw spindle and its small longitudinal movement, is mounted upon the said spindle and cam shaft. When roller bearings are used then they are placed in recesses,—shown in section at Fig. 7,—formed for their reception in the pendant sliding portions 43, 44. The said recesses are provided with covering plates or discs 49, 49, 50, 50. The saw spindle 47 and the cam shaft 48 are arranged on the same horizontal level and parallel with each other. Although the saw shaft and the cam shaft are described as being in a horizontal plane, it should be understood that they may,—if required,—be arranged on the machine to be in either a vertical or angular plane. Both ends of the saw or disc spindle 47 are arranged to project a suitable distance beyond the outer faces of the rear sliding portions 43, 44. On the front projecting end of the saw or disc spindle 47 is mounted and fixed, in the usual manner, by the discs 52, 53, and lock nuts 54, the saw or disc 51, and on the rear projecting end of the said spindle is mounted a fixed and a loose pulley, marked respectively 55, 56, so that a rotary motion may be imparted to the said spindle from any suitable source of power, or an electric motor,—not shown in the drawings,—is employed for imparting an individual drive to said spindle either direct or through a flexible coupling. The spindle 47 is retained in its working position by means of the collars 57, 58 fixed thereon. A space 57ª (Fig. 7) of about, say, one-sixteenth to one-eighth of an inch is left between the collar 57 and the pendant sliding portion 43 which permits of a slight longitudinal motion of the shaft or spindle 47 taking place simultaneously with its rotation. On the saw or disc spindle 47 are also mounted and fixed a pair of collars 59, 60 at a suitable distance apart,—or, in place of the collars, a boss having peripheral or cam grooves formed therein may be employed,—with which a cam or a circular projecting portion 63 of a boss 64,—fixed on the cam shaft 48 by a grub screw 65,—is arranged to engage, the projecting portion 63 is of eccentric formation on its side faces and arranged to pass into the space 66 between the collars 59, 60 whereby a longitudinal sliding motion is imparted to the saw or disc spindle 47 alternately in, say, a left and right hand direction. The collars 59, 60 are shown retained in position by grub screws 61, 62. To allow the saw spindle to have a slight longitudinal movement within the bearings 43, 44, each roller bearing 45 is made of three parts, an annular outer ring 45ª secured within the recess 45ᵇ, a smaller annular ring 45ᶜ secured to the shaft and roller bearings between said two rings, the smaller ring being adapted to enter within the recesses 45ᵈ (formed in the bearing 43 or 44 and the cap 49) so as to be capable of a slight lateral movement relative to the outer ring when the spindle 47 is given its slight longitudinal movement. The cam shaft 48 is shown at Fig. 7 shorter in length than the saw or disc spindle 47 and its front end is mounted in a bearing or recess 67 formed for its reception in the front sliding pendant portion 43, and its rear end 48ˣ may be reduced in diameter and project a suitable distance beyond the outer face of the rear pendant sliding portion 44. On the rear end of the cam shaft 48 is fixed a collar 68 for purposes to be described. The saw or disc spindle 47 and the cam shaft 48 are geared together by spur wheels 69, 70 of the same or different diameters, the spur wheel 69 on the saw or disc spindle 47 is fixed thereon by a key 71 or other suitable means, and the second spur wheel 70 is mounted on the cam shaft 48 and it is arranged to slide on a spline 72 in the space between the outer surface of the rear pendant sliding portion 44 and the collar 68 on the end of the cam shaft. The two spur wheels 69, 70 are retained in gear by means of the bifurcated end 73,—into which a portion of the spur wheel 70 passes,—of a shifting rod 74, the outer end of which is secured to one end of a sliding bar 75 mounted in slots formed for its reception in a pair of projections 76, 77 formed on one of the ends of a pair of pendant supports 78, 79 which are formed on, or fixed to, one of the vertical sides 40 of the hereinbefore named adjustable supporting saddle as shown at Figures 3 and 4. The sliding bar 75 is provided with a handle 80 for operating purposes. By this means the rotation of the cam shaft 48 may be arrested whenever the spur wheels 69, 70 are thrown out of gear.

The horizontal reciprocation of the pendant sliding portions 43, 44 simultaneously with the rotation of the saw or disc 51 is obtained in the following manner, namely:—

At a suitable distance from each end of the cam shaft 48, and from, say, the inner surface of each pendant sliding portion 43, 44 is formed or fixed upon the said shaft a cam or eccentric for imparting a transverse movement to the pendant portions 43, 44 and parts connected therewith. Each of the said two cams or eccentrics,—which are marked respectively 81 and 82,—is arranged to pass into a recess 83 formed for its reception in one of the ends of a link or lever 85 or 86; or, as shown at Fig. 7, the recess 83 is enlarged to receive a ball race or roller bearing 87 into which the cam or eccentric 81 or 82 is arranged to pass. The recesses 83, 83 are covered by plates or discs 88, 89. The opposite and outer ends of the links or levers 85, 86 are pivotably anchored on horizontal pins 90, 91 carried by the lower bifurcated ends 92, 93,—as shown at Figs. 3 to 7,—of the hereinbefore mentioned pendant supports 78, 79. The two pendant supports 78, 79 are respectively fixed to the supporting saddle at suitable distances apart so as to permit of the inner end of each link 85, 86 being adjacent to the inner surface of each of the pendant sliding portions 43, 44. The said ends of the links are also retained in their working positions respectively by the boss 64 of the cam 63 which imparts the longitudinal movement to the saw or disc spindle 47 and by a collar 94,—fixed by a grub screw 95 on the cam shaft 48,—at the opposite end.

The eccentric portions of the peripheries of the cams 81, 82,—during their rotation,—are allowed freedom of movement in a vertical plane, due to their retaining links being pivoted, but which are prevented from movement in a horizontal plane; this arrangement causes the shaft 48 to be moved in the latter plane and carry the pendant sliding portions 43, 44,—together with the shaft 47 mounted therein,—with it, whereby the approach or recession of the saw or disc 51 is obtained.

By arranging the saw or disc spindle 47 and cam shaft 48 to be mounted in a pair of pendant sliding portions 43, 44, common to said spindle and shaft, the latter will be retained at a fixed distance apart in such a manner that they are only capable of a rotary, and a sliding movement transversely to the supporting saddle, and are in horizontal parallel relation to each other during the reciprocation of the said sliding portions required for causing the saw or disc to operate intermittently with a slight percussive and abrasive action upon the material; at the same time permitting of a different portion of the peripheral edge of the rotating saw or disc 51 to be brought into contact with the material at each revolution. The above named reciprocation of the pendant portions 43, 44, is obtained by arranging the shafts 47, 48 and links 85, 86, in horizontal alignment and mounting the eccentrics or cams 81, 82, in the free enlarged ends of the links 85, 86, which are pivotally anchored on the pins 90, 91, as before stated. This arrangement allows the eccentrics or cams freedom of movement in an upward and downward direction in a vertical plane through the arc mark A, A, but at the same time the eccentrics or cams 81, 82 are prevented from movement in the horizontal plane B, B, owing to their retention at a definite radial distance from the pivots 90, 91, by means of the links 85, 86. By the continued rotation of the shaft 48 and the eccentrics or cams 81, 82, in the direction of, say, the arrow *a* (Figs. 8 and 9) the said eccentrics or cams will assume the position shown at Fig. 9, and by the line A, A, always remaining the constant radial centre of them, the eccentrics or cams will throw the shaft out of that centre in the direction of arrow *b* as shown, for giving it a motion in the horizontal plane B, B. When the shaft 48 receives the said horizontal motion it will move,—through the medium of its reduced ends,—the pendant portions 43, 44, and any parts connected therewith.

The simultaneous slight lateral movement of the saw or disc 51 caused by the longitudinal movement of its spindle 47 also facilitates its working by reducing the friction on its flat surfaces.

This invention can be applied to machines having more than one saw.

By arranging and connecting together the saw or disc spindle 47, and cam shaft 48 as herein described the motion to the saw or cutting disc 51 is compounded of three motions of its shaft namely:—(1) rotation about its own axis motion being imparted to the said spindle, by, say, a belt being shipped from the loose pulley 55 on to the fixed pulley; the spindle 47 being retained in a working position by the collars 57, 58, (2) a linear oscillatory movement due to the arrangement of eccentric cams 81, 82, which simultaneously operate the sliding pendant blocks 43, 44, and links 85, 86 pivotably anchored at one end to the pendant portions 78, 79, so that the saw or cutting disc approaches and recedes from the work at a constant level, and (3) a small lateral motion due to the longitudinal axial movement of the shaft. The said lateral movement is obtained by mounting and fixing the discs 59, 60 on the saw spindle 47 with a space 66 between them into which the cam or eccentrically shaped projection 63 of the boss 64,—fixed upon the cam shaft 48,—is arranged to pass. The result is that the saw or cutting disc 51 always remains in a plane parallel to itself instead of being constantly tilted as is the case in other machines now being sold and used. By the saw spindle 47 and cam shaft 48 being geared together, and the required rotary motion imparted thereto, during the rotation of shaft 48 the shaft 47 has a small longitudinal motion imparted to it simultaneously with its rotation. The herein described eccentric cam arrangement causes both the cam shaft 48 and the saw or disc spindle 47 to reciprocate, and the said spindle and shaft can be rotated at the same or different speeds.

What we claim is:—

1. In a machine for cutting stone, a bed, a standard fixed on said bed, rails mounted on the upper surface of said bed, an adjustable work supporting carriage movably mounted on the rails for presenting the work to a circular saw, a saw spindle carried by a saddle vertically adjustable on said standard, a circular saw mounted on said spindle means for imparting to said spindle a rotary motion, means for imparting to said spindle a linear oscillatory movement at a right angle to its own axis, and means for imparting to said spindle a slight longitudinal axial reciprocation, whereby said three movements are capable of simultaneous operation,—independent of any movement of said saddle and carriage,—and the saw spindle remains substantially in a plane parallel to itself during its movements.

2. In a machine for cutting stone, a bed, a standard on said bed, a saddle adjustably mounted on said standard, a saw spindle having a compound motion and extending from the saddle a circular saw mounted on said spindle, a cam shaft, gearing associated with said spindle for driving said cam shaft, pendant members supporting said shaft in bearings therein and adapted to slide in bearings on the saddle, said pendant members retaining the spindle and shaft parallel to each other, cams mounted on said cam shaft, links mounted on said cams and pivotally anchored to the saddle, whereby a linear oscillatory movement is imparted to the saw spindle during its rotation.

3. In a machine for cutting stone, a bed, a standard on said bed, a saddle mounted on said standard, a saw spindle to which a compound motion is imparted extending from the saddle a circular saw mounted on said spindle, gearing associated with said spindle, spur gearing in mesh with said first mentioned gearing, a cam shaft supported by the saddle and connected by said gearing to the saw spindle, pendant members slidably mounted on the saddle, bearings formed in said members for the reception of the saw spindle and cam shaft, said spindle being slidable and retained in parallel relation to the cam shaft at a fixed distance therefrom, cams mounted on said cam shaft and associated with pivoted links, whereby said cams are capable of movement substantially in a vertical plane and the spindle in a horizontal plane.

4. In a machine for cutting stone, a bed, a standard on said bed, a saddle carried by the standard, a saw spindle extending from the saddle having a compound motion imparted thereto during the cutting operation, a circular saw mounted on said spindle, a cam shaft connected by spur gearing to the saw spindle, cams mounted on the cam shaft, links mounted on said cams and pivotally anchored to the saddle, pendant members slidably mounted in the saddle of the machine for the reception of the spindle and shaft, said pendant members retaining the shaft and spindle parallel to each other and having a linear oscillatory movement imparted to them by the operation of the cams mounted on the cam shaft in conjunction with said links, two discs fixedly mounted on said saw spindle forming a groove, and means co-acting with said groove by which a longitudinal axial reciprocation of the saw spindle is obtained.

5. A machine for cutting stone including a two-portioned bed, said portions being arranged at right angles to each other, a standard on one portion, a saddle carried by the standard, parallel rails on the remaining portion, a truck member upon which stone to be cut is secured adapted to travel on said rails, means for adjusting and intermittently imparting motion to said truck, a spindle extending from said saddle at right angles to the truck, a saw mounted on said spindle, means for imparting a compound motion to said spindle comprising a cam shaft driven by said spindle through spur gearing, cams associated with said cam shaft, said spindle and shaft being slidable transversely on the saddle, means for retaining the spindle and shaft parallel to each other, two discs fixedly mounted on said saw spindle forming a groove, and means for producing axial reciprocation of the spindle.

6. In a machine for cutting stone and the like materials including a bed, a standard extending above said bed, a saddle adjustably mounted on said standard and a saw spindle carried by said saddle, means for imparting rotary motion to said saw spindle, means actuated by the rotary motion of said spindle for imparting radial reciprocating motion to said saw spindle during the rotation thereof and means actuated by the rotary motion of said spindle for imparting longitudinal reciprocating motion to said saw spindle during the rotation thereof.

WILLIAM HENRY FITTON.
GRAHAM ELLIOTT.